US012566824B2

(12) United States Patent
Wang et al.

(10) Patent No.:  US 12,566,824 B2
(45) Date of Patent:       Mar. 3, 2026

(54) METHOD, ELECTRONIC DEVICE, AND COMPUTER PROGRAM PRODUCT FOR DATA PROCESSING

(71) Applicant: Dell Products L.P., Round Rock, TX (US)

(72) Inventors: Xia Wang, Shanghai (CN); Xiao Le Shang, Shanghai (CN); Wesley Wei Sun, Shanghai (CN); Young Yangchun Wu, Shanghai (CN); Xiangdong Huang, Shanghai (CN); Xin Li, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 391 days.

(21) Appl. No.: 18/065,574

(22) Filed: Dec. 13, 2022

(65) Prior Publication Data

US 2024/0111836 A1      Apr. 4, 2024

(30) Foreign Application Priority Data

Sep. 30, 2022    (CN) ......................... 202211217524.7

(51) Int. Cl.
G06F 18/2413       (2023.01)
G06F 16/21       (2019.01)

(52) U.S. Cl.
CPC ...... G06F 18/24147 (2023.01); G06F 16/211 (2019.01)

(58) Field of Classification Search
CPC ............. G06F 18/24147; G06F 16/211; G06F 16/2474; G06F 16/22
See application file for complete search history.

(56) References Cited

U.S. PATENT DOCUMENTS 9,815,633 B1 * 11/2017 Kisser .................... B65G 37/02
2014/0081958 A1 * 3/2014 Lorge ............... G06F 16/24578
                                                              707/723
2015/0261800 A1 * 9/2015 Botero .................... G06F 16/22
                                                              707/610
2019/0079957 A1 * 3/2019 Gao ...................... G06F 16/211
2021/0374153 A1 * 12/2021 Saxena ................... G06F 16/24
2023/0004533 A1 * 1/2023 Valiullin ............. H03M 7/3077

* cited by examiner

*Primary Examiner* — Tyler J Torgrimson
(74) *Attorney, Agent, or Firm* — Amin, Turocy & Watson, LLP

(57)       ABSTRACT

Data processing is disclosed in various aspects. For instance, an example method includes acquiring a plurality of objects with a sortable schema, the sortable schema specifying at least one field of the plurality of objects; determining metadata, sortable data, and non-sortable data of the plurality of objects on the basis of a value of the at least one field of the plurality of objects; and generating a serialized representation of the plurality of objects on the basis of the metadata, the sortable data, and the non-sortable data. By the method, one group of objects is converted into a serialized representation with sortable information, so that efficient object searching can be achieved without relying on an additional comparator.

20 Claims, 6 Drawing Sheets

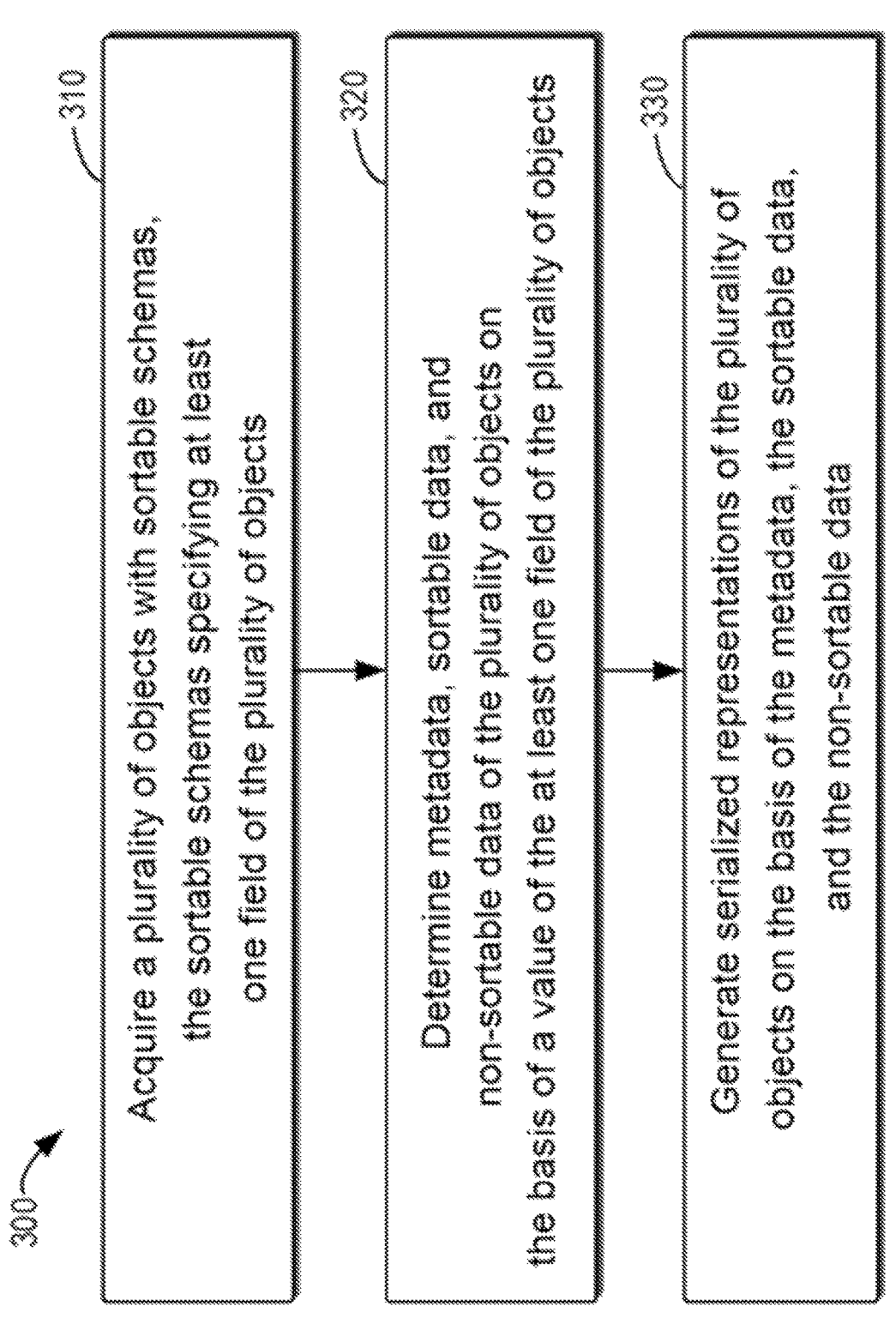

300

310

Acquire a plurality of objects with sortable schemas, the sortable schemas specifying at least one field of the plurality of objects

320

Determine metadata, sortable data, and non-sortable data of the plurality of objects on the basis of a value of the at least one field of the plurality of objects

330

Generate serialized representations of the plurality of objects on the basis of the metadata, the sortable data, and the non-sortable data

FIG. 3

METHOD, ELECTRONIC DEVICE, AND COMPUTER PROGRAM PRODUCT FOR DATA PROCESSING

RELATED APPLICATION

The present application claims the benefit of priority to Chinese Patent Application No. 202211217524.7, filed on Sep. 30, 2022, which application is hereby incorporated into the present application by reference herein in its entirety.

TECHNICAL FIELD

Embodiments of the present disclosure relate to the field of computers, and more particularly, to a method, an electronic device, and a computer program product for data processing.

BACKGROUND

In order to store and search for structured data (for example, objects in Java or other programming languages), users sometimes design serializers/deserializers and comparators. A serializer is configured to serialize an object into binary data to save storage space. When it is requested to search for an object, a deserializer is used to rebuild the binary data into the object, and a comparator is used for searching. Due to the diversity of structured data, users sometimes design serializers/deserializers and comparators for specific structured data on the basis of different structured data, resulting in low extensibility and high development cost.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

According to embodiments of the present disclosure, a data processing scheme is provided, which is used for converting objects into a serialized representation with sortable information, so as to promote efficient object searching.

According to a first example embodiment of the present disclosure, a data processing method is provided. The method includes acquiring, by a system comprising a processor, a group of objects with a sortable schema, the sortable schema specifying at least one field of the group of objects; determining metadata, sortable data, and non-sortable data of the group of objects on the basis of a value of the at least one field of the group of objects; and generating a serialized representation of the group of objects on the basis of the metadata, the sortable data, and the non-sortable data.

According to a second example embodiment of the present disclosure, a device is provided. The device includes at least one processing unit and at least one memory, the at least one memory being coupled to the at least one processing unit and storing instructions for execution by the at least one processing unit, wherein the instructions, when executed by the at least one processing unit, cause the device to perform a method including: acquiring objects with a sortable schema, the sortable schema specifying at least one field of the objects; determining metadata, sortable data, and non-sortable data of the objects on the basis of a value of the at least one field of the objects; and generating a serialized representation of the objects on the basis of the metadata, the sortable data, and the non-sortable data.

According to a third example embodiment of the present disclosure, a non-transitory computer program product is provided, including machine-executable instructions, wherein the machine-executable instructions, when executed by a device comprising a processor, cause the device to perform operations, comprising: acquiring a plurality of objects with a sortable schema, the sortable schema specifying at least one field of the plurality of objects; determining metadata, sortable data, and non-sortable data of the plurality of objects on the basis of a value of the at least one field of the plurality of objects; and generating a serialized representation of the plurality of objects on the basis of the metadata, the sortable data, and the non-sortable data.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which:

FIG. 3 illustrates a schematic flow chart of a data processing process according to some embodiments of the present disclosure;

DETAILED DESCRIPTION

Figure 1:
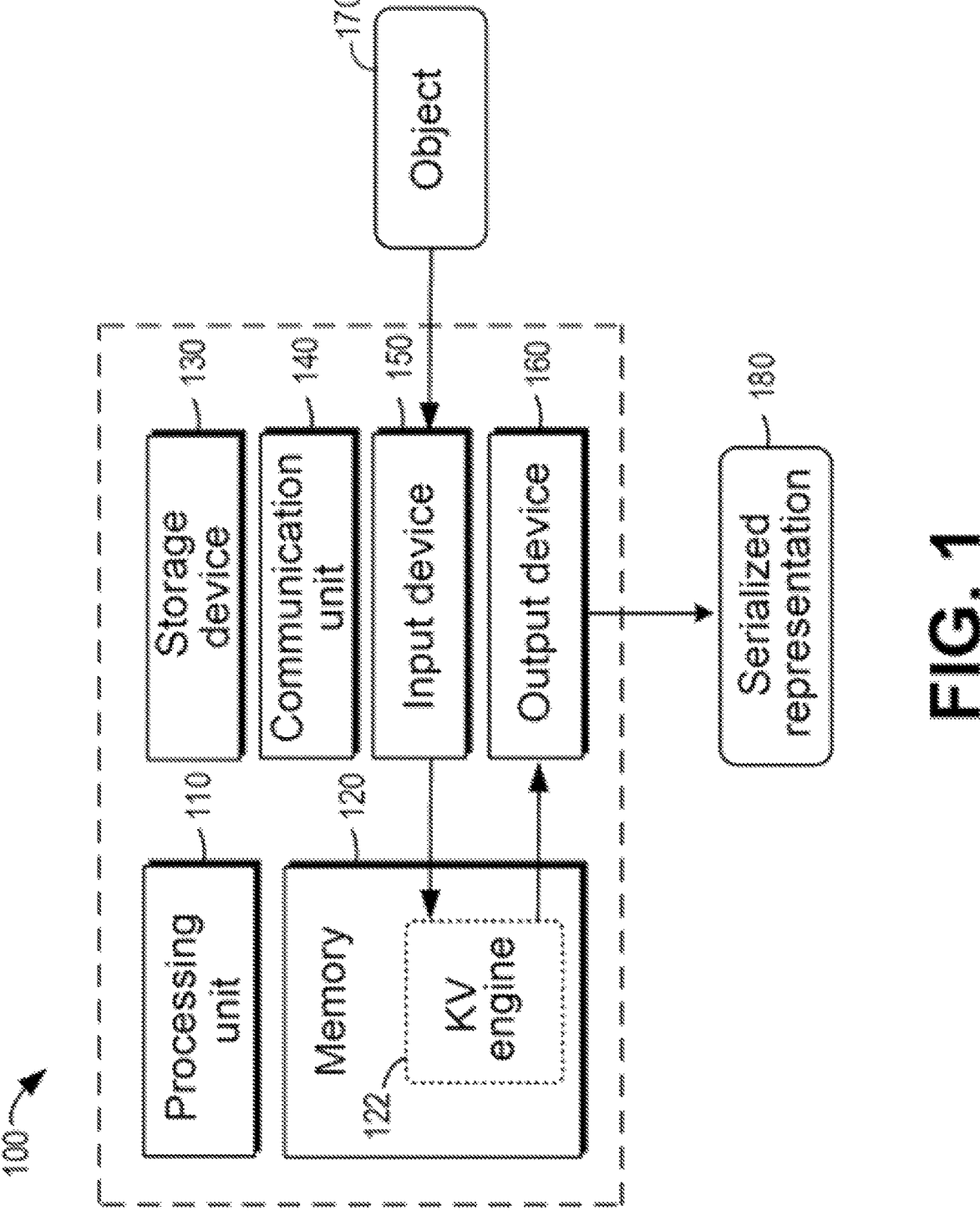
FIG. 1 illustrates a block diagram of an example environment in which some embodiments of the present disclosure may be implemented.

The embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In addition, all specific numerical values herein are examples, which are provided only to aid in understanding, and are not intended to limit the scope.

Objects can be serialized into binary data and stored in a database. When it is requested to search the database for an object, the stored binary data is to be deserialized into objects, and a specially designed comparator is to be used for searching. This leads to low extensibility of the database system and high development cost. On the other hand, the execution of the deserializer and the comparator consumes a lot of processor resources, resulting in low searching efficiency.

In view of this, a data processing method is provided, which is used for converting objects into a serialized representation including sortable information, and a searching operation can be directly performed on this serialized representation. The serialized representation can also be referred to as binary data herein. The method includes acquiring a plurality of objects with a sortable schema, the sortable schema specifying fields of these objects. These objects can be comparable due to the sortable schema. The method also includes determining metadata, sortable data, and non-sortable data of the plurality of objects on the basis of values of the fields of the above objects. The method further includes generating a serialized representation of the plurality of objects on the basis of the metadata, the sortable data, and the non-sortable data. By the method, structured objects are converted into a serialized representation with sortable information, so that efficient object searching can be achieved without relying on an additional comparator.

Implementation details of the embodiments of the present disclosure will be described in detail below with reference to FIG. 1 to FIG. 7.

FIG. 1 illustrates a block diagram of electronic device 100 that can implement a plurality of implementations of the present disclosure. It should be understood that electronic device 100 shown in FIG. 1 is merely an example and should not constitute any limitation to the functions and scope of the implementations described in the present disclosure. As shown in FIG. 1, components of computing device 100 may include, but are not limited to, one or more processors or processing units 110, memories 120, storage devices 130, one or more communication units 140, one or more input devices 150, and one or more output devices 160.

In some implementations, electronic device 100 may be implemented as a variety of user terminals or service terminals with computing capabilities. The service terminals may be servers provided by various service providers, large-scale computing devices, and the like. For example, the user terminals may be any type of mobile, fixed, or portable terminals, including a mobile phone, a site, a unit, a device, a multimedia computer, a multimedia tablet, an Internet node, a communicator, a desktop computer, a laptop computer, a notebook computer, a netbook computer, a tablet computer, a personal communication system (PCS) device, a personal navigation device, a personal digital assistant (PDA), an audio/video player, a digital camera/camcorder, a positioning device, a television receiver, a radio broadcast receiver, an e-book device, a gaming device, or any combination thereof, including accessories and peripherals of such devices, or any combination thereof. It can also be expected that electronic device 100 may support a user-specific interface (such as "wearable" circuit) of any type.

Processing unit 110 may be an actual or virtual processor and can perform various processing according to programs stored in memory 120. In a multiprocessor system, a plurality of processing units execute computer-executable instructions in parallel to improve the parallel processing capability of electronic device 100. Processing unit 110 may also be referred to as a central processing unit (CPU), a graphics processing unit (GPU), a microprocessor, a controller, and a microcontroller.

Electronic device 100 usually includes a plurality of computer storage media. Such media may be any available media that electronic device 100 may access, including, but not limited to, volatile and nonvolatile media, and removable and non-removable media. Memory 120 may be a volatile memory (such as a register, a cache, a random access memory (RAM)), a nonvolatile memory (such as a read-only memory (ROM), an electrically erasable programmable read-only memory (EEPROM), and a flash memory), or some combinations thereof. Memory 120 may include a key value (KV) engine 122 implemented as a program module. KV engine 122 may be a program module configured to perform the data processing described herein. KV engine 122 may be accessed and run by processing unit 110 to achieve corresponding functions.

Storage device 130 may be a removable or non-removable medium, and may include a machine-readable medium that can be used for storing information and/or data and can be accessed within electronic device 100. Electronic device 100 may further include additional removable/non-removable, volatile/nonvolatile storage media. Although not shown in FIG. 1, a disk drive for reading or writing from a removable, nonvolatile disk and an optical disk drive for reading or writing from a removable, nonvolatile optical disk may be provided. In these cases, each drive may be connected to a bus (not shown) by one or more data medium interfaces.

Communication unit 140 achieves communication with another computing device through a communication medium. Additionally, the functions of the components of electronic device 100 may be implemented in a single computing cluster or multiple computing machines that can communicate through a communication connection. Thus, electronic device 100 may operate in a networking environment using a logical connection to one or more other servers, personal computers (PCs), or another general network node.

Input device 150 may be one or more various input devices, such as a mouse, a keyboard, a trackball, and a voice input device. Output device 160 may be one or more output devices, such as a display, a speaker, and a printer. Electronic device 100 may also communicate, as required or requested, with one or more external devices (not shown), such as a storage device and a display device, through communication unit 140, with one or more devices that enable users to interact with electronic device 100, or with any device (such as a network card and a modem) that enables electronic device 100 to communicate with one or more other computing devices. Such communication may be performed via an input/output (I/O) interface (not shown).

In some implementations, in addition to being integrated on a single device, some or all of the components of electronic device 100 may also be set in the form of a cloud computing architecture. In the cloud computing architecture, these components may be remotely arranged and may work together to achieve the functions described in the present disclosure. In some implementations, cloud computing provides computing, software, data access, and storage services, which do not require terminal users to know physical locations or configurations of systems or hardware which provide these services. In various implementations, cloud computing provides services via a wide area network (e.g., the Internet) with appropriate protocols. For example, a cloud computing provider provides applications through a wide area network, and they are accessible through a web browser or any other computing components. Software or components of the cloud computing architecture and corresponding data may be stored on a server at a remote location. Computing resources in a cloud computing environment may be merged at a remote data center location, or they may be dispersed. Cloud computing infrastructures can provide services through a shared data center, even if they are represented as a single access point for users. Therefore, the components and functions described herein may be provided from a service provider at a remote location by using a cloud computing architecture. Alternatively, they may also be provided from a conventional server, or they may be installed on a client terminal device directly or in other manners.

Electronic device 100 may perform a data processing function according to various implementations of the present disclosure. As shown in FIG. 1, electronic device 100 may receive a plurality of objects 170 through input device 150, and objects 170 may be objects about service data. Alternatively, electronic device 100 may also read objects 170 from storage device 130 or receive from communication device 140 objects 170 from other devices. Electronic device 100 may transmit input text 170 to KV engine 122. KV engine 122 generates serialized representation 180 of object 170 on the basis of object 170. Serialized representation 180 is reconstructed into object 170 by deserialization. According to the embodiment of the present disclosure, serialized representation 180 includes sortable information and can be directly used for searching.

Figure 2:
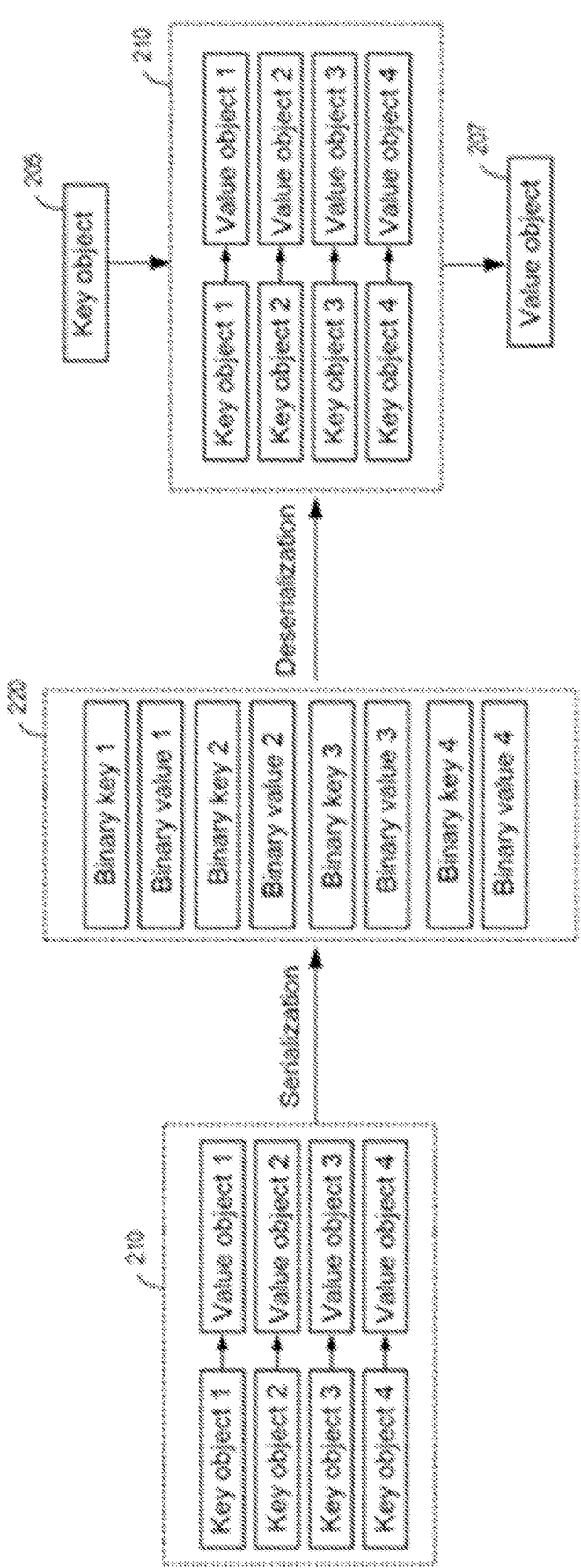
FIG. 2 illustrates a schematic diagram of an example process of searching for objects using a deserializer.

FIG. 2 illustrates a schematic diagram of an example process of searching for objects using a deserializer. The process shown in FIG. 2 is a conventional object searching process. As shown in FIG. 2, objects 210 include several key objects and value objects in pairs. Objects 210 may be service data and serialized into binary data 220 for saving storage space of a database or transmission on a network.

Binary data 220 may be stored in a data structure of the database (for example, at a node of a B+ tree). As an example, through a serialization operation, key object 1 is serialized into binary key 1 in binary data 220; value object 1 is serialized into binary value 1; and serialized key 1 and value 1 are stored adjacently, and so on. It can be seen that binary representations 220 of objects 210 are stored in the database according to a numbering order, and the keys and values are stored alternately, so they cannot be searched for. When key object 205 is used for searching, binary data 220 is reconstructed into objects 210 through a deserialization operation. Key object 205 is compared with a key object in objects 210 through a comparator to find a matching key object, so that value object 207 is obtained.

According to the embodiments of the present disclosure, data can be processed using a sortable schema so as to obtain a sortable serialized representation. Description will be made below with reference to FIG. 3 to FIG. 7.

FIG. 3 illustrates a schematic flow chart of data processing process 300 according to some embodiments of the present disclosure. Process 300 may be executed by, for example, electronic device 100 shown in FIG. 1, and more specifically, by processing unit 102 through running a program module of KV engine 122. It should be understood that process 300 may also include additional actions not shown and/or omit actions shown, and the scope of the present disclosure is not limited in this regard.

At block 310, a plurality of objects with a sortable schema are acquired, the sortable schema specifying at least one field of the plurality of objects. The sortable schema defines fields of the objects. The fields can have one or more of the following types:

Basic type: It includes an integer type (int8, int64, etc.), a character type (such as utf8, utf64, etc.), a floating point type, a Boolean type, etc.

Object type: It is used for storing a group of fields.

Condition type: It is used for achieving polymorphism, that is, the field can be of any type (including null) according to conditions.

List type: It is used for storing data of the same type.

The basic type has its own comparator, such as numeric values or character strings, and does not need to be defined by users. The object type, the condition type, and the list type can be obtained on the basis of the basic type, so there is no need to define an additional comparator. Developers can also add more basic types.

An example object is defined as follows. Object A includes the above four types of fields.

```
Object A {
    + int8 type; // Basic type, "+" indicates a positive order
    - UUID id; // Object type, defined below, "-" indicates a reverse order
    + int8[ ] list; // List type, its content is arbitrary, and "+" indicates a
    positive order
    (+B1,+B2) subkey // Condition type, "+" indicates a positive order
object UUID {
    + int64 high;
    + int64 low;
}
object B1 {
    + int8 value;
}
object B2 {
    + utf8 value;
}
```

Fields of the basic type, the object type, and the list type can be sorted according to a comparison manner defined in the structure ("+" means positive order, and "−" means reverse order). In a field of the list type, if an element is missing, it can be regarded as the minimum. For the condition type, the fields can be sorted according to an order in a condition type declaration. For example, for the above subkey field, data with values of B1 is always in front of data with values of B2.

At block 320, metadata, sortable data, and non-sortable data of the plurality of objects are determined on the basis of a value of the at least one field of the plurality of objects. The metadata, the sortable data, and the non-sortable data are constituents of the serialized representation of the plurality of objects. These data are determined using a serializer.

Figure 4:
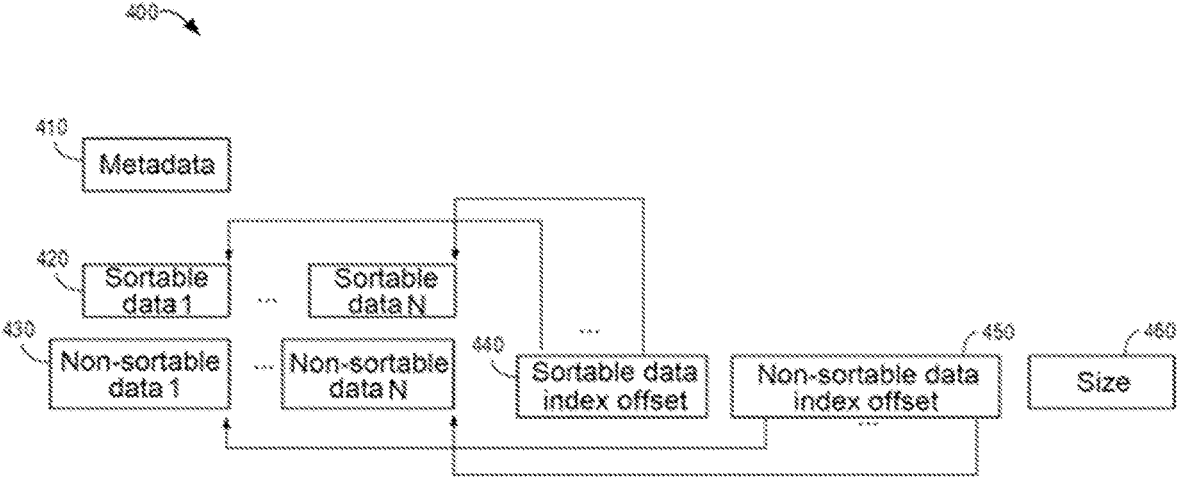
FIG. 4 illustrates a schematic diagram of a serialized representation according to some embodiments of the present disclosure.

FIG. 4 illustrates a schematic diagram of serialized representation 400 according to some embodiments of the present disclosure. In serialized representation 400, the metadata is used for storing parameters used for serialization or deserialization. The deserializer reads the metadata before reconstructing serialized representation 400 into an object.

For example, metadata 410 may store a byte width of a variable. If values of the field of the integer type of all the objects are within a range (for example, −129 to 128), it can be determined that the metadata about the field is 1 byte. The serializer then processes this field as a 1-byte integer. It should be noted that metadata 410 does not store all the information of the sortable schema, but only stores dynamic parameters not declared in the schema, such as a byte width of a variable. In addition, developers can set metadata for their custom basic types.

The metadata may also include version information of the sortable schema. The version information is used for controlling the upgrade or update of the sortable schema. When the sortable schema changes, such as adding or deleting fields, the version information is added. The version information is used for distinguishing sortable schemas of different versions and corresponding objects. A corresponding serializer and deserializer are set for the sortable schema of each version. In consideration of compatibility, the old serializer and deserializer are kept when adding version information.

Metadata 410 is followed by sortable data 420. As shown in the figures, sortable data 420 includes sortable data 1, sortable data 2, and the like generated for each object. Sortable data 420 includes bytes for direct comparison. Sortable data 420 is generated according to the values of the objects. Sortable data 420 is followed by non-sortable data 430. The non-sortable data is used for storing data not for comparison. Non-sortable data 430 includes non-sortable data 1, non-sortable data 2, and the like generated for each object. Non-sortable data 430 may include offsets or positions of various fields in the sortable data and is used for deserialization. As mentioned above, the sortable schema of the objects includes fields of a basic type, an object type, a condition type, and a list type. The following will describe in detail how to obtain the corresponding sortable data and non-sortable data from these types of fields, which will not be detailed here.

In some embodiments, after non-sortable data 430, there are also sortable data index offset 440, non-sortable data index offset 450, and size 460. Sortable data index offset 440 stores a position of the sortable data of each of the plurality of objects in serialized representation 400. Non-sortable data index offset 450 stores a position of the non-sortable data of each of the plurality of objects in serialized representation 400. Size 460 may store the number of objects related to serialized representation 400.

At block 330, a serialized representation of the plurality of objects are generated on the basis of the metadata, the sortable data, and the non-sortable data. After the metadata, sortable data, and non-sortable data of the plurality of objects are determined, the data can be spliced together. Sortable data index offset 440, non-sortable data index offset 450, and size 460 are added optionally, so as to obtain serialized representation 400 of the acquired plurality of objects. In some embodiments, these objects can also be sorted according to the sortable data of each object, and a sorting result can be used for faster searching, for example, by dichotomy.

Figure 5:
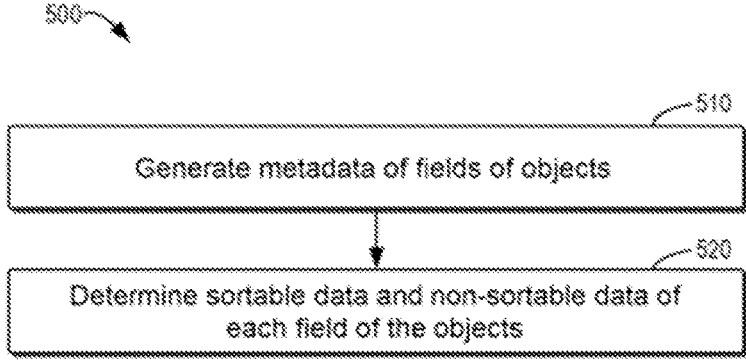
FIG. 5 illustrates a schematic flow chart of a process for generating a serialized representation according to some embodiments of the present disclosure.
Figure 6:
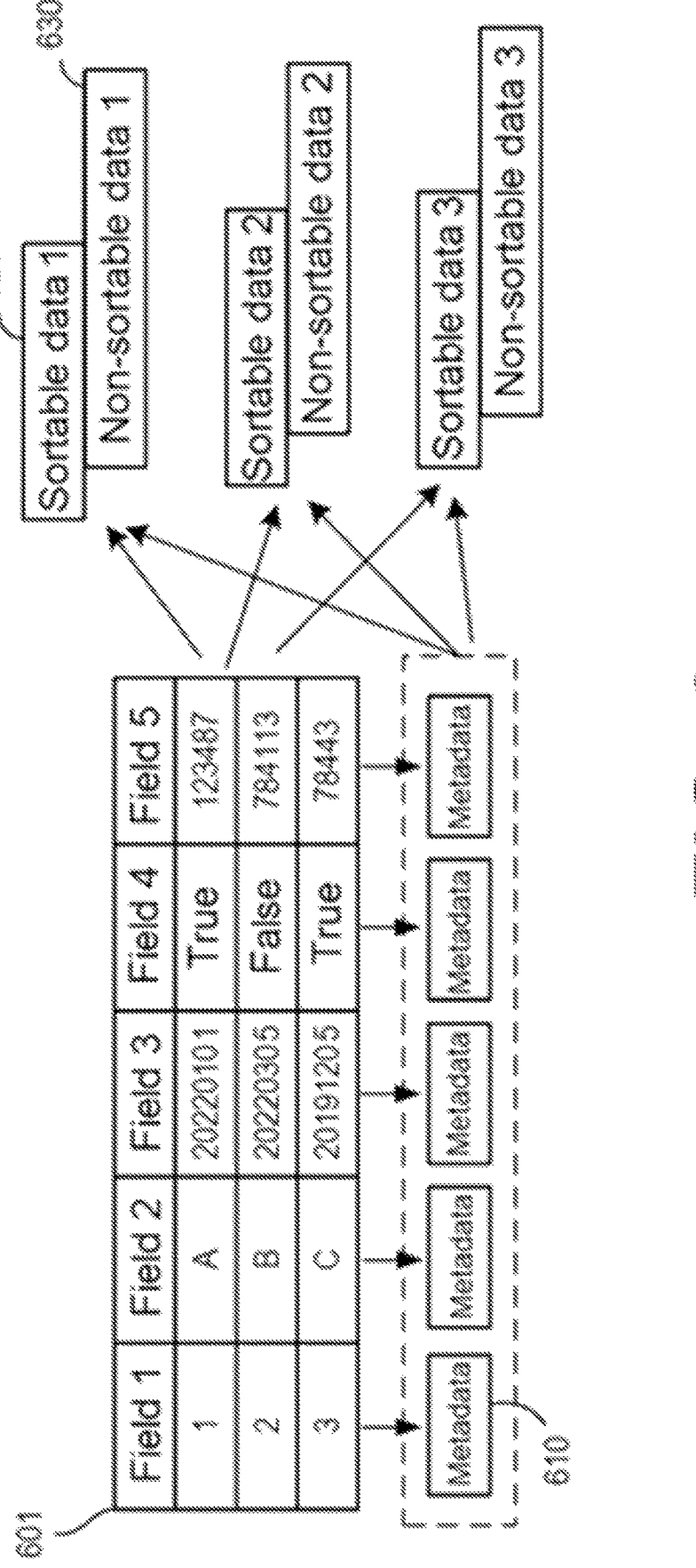
FIG. 6 illustrates a schematic diagram of an example of generating a serialized representation according to some embodiments of the present disclosure.

FIG. 5 illustrates a schematic flow chart of process 500 for generating a serialized representation according to some embodiments of the present disclosure. Process 500 may be an example implementation of block 320 of FIG. 3. It should be understood that process 500 may also include additional actions not shown and/or omit actions shown, and the scope of the present disclosure is not limited in this regard. For ease of understanding, process 500 is described in combination with FIG. 6. FIG. 6 illustrates a schematic diagram of an example of generating a serialized representation according to some embodiments of the present disclosure.

At block 510, metadata of fields of the objects is generated. Specifically, for each field in the sortable schema, the metadata of the field is determined by traversing the values of the objects. Table 601 in FIG. 6 shows three example objects with fields 1 to 5. For field 1, the values of the objects are traversed to obtain metadata 610 about field 1, such as metadata related to a range of the value of field 1. That is, traversing can be performed along the columns of Table 601 to obtain the metadata. The metadata obtained after traversing for all the fields are combined together as the total metadata.

At block 520, sortable data and non-sortable data of each field of the objects are determined. Specifically, for each row corresponding to each object in Table 601, such as the first row, sortable data 620 of the first object is generated according to the values of the fields in turn. Then, non-sortable data 630 of the first object is determined according to the positions of the fields in sortable data 620. In other words, traversing can be performed along the rows of Table 601 to obtain the sortable data and the non-sortable data of the objects. In this way, the sortable data and the non-sortable data of all the objects can be generated.

Next, a method for determining the metadata, sortable data, and non-sortable data of fields of all the types will be described.

Fields of the basic type may include fixed-length fields (for example, int32, float32, and Boolean type) and variable-length fields (for example, character string and array). It is feasible that the fixed-length fields are not set with metadata. Alternatively, the range of the field can be determined by checking the values of this field of all the objects, and metadata for indicating a byte width is set. The fixed-length fields can be compared directly. For example, for a field with fixed two bytes (byte [2]), [1, 1]<[1, 2]<[2, 1], in order to make the variable-length fields comparable, for example, for comparing values [1] and [1, 1] of the variable-length byte type (byte [ ]), a specified symbol (such as "\0") may be added to the value of an object to indicate an end. Therefore, after such symbol is added, values of variable-length fields can also be compared. For example, [1, (0)]<[1, 1, (0)]. Information indicating a size may also be added to clearly indicate the size of a field, so that the fields of the variable length types are comparable. In addition, after the sortable data of a field is determined, position information about the sortable data of this field can be stored as the non-sortable data.

A field of the object type includes at least one subfield. A combination of metadata about the at least one subfield can be determined as the metadata of the field of the object type. A combination of sortable data about the at least one subfield can be determined as sortable data about the field of the object type. A combination of non-sortable data about the at least one sub-field can be determined as non-sortable data about the field of the object type. In some embodiments, for the purpose of deserialization, the non-sortable data of the field of the object type may also include the index offsets of the sortable data and the non-sortable data of all subfields.

A field of the condition type involves a plurality of optional values (which may include a "nullable type"). For a specific object, the field of the condition type includes a selected value among the plurality of optional values. In some embodiments, metadata of the selected value of the object may be determined as metadata about the field of the condition type. As mentioned above, sorting can be performed according to an order in a condition type declaration. Therefore, a combination of a condition indicator of the selected value and sortable data of the selected value can be determined as sortable data about the field of the condition type. That is, the condition indicator will be used preferentially for comparison. For example, an optional value declared earlier is always smaller. In some embodiments, it can be considered that a field of the nullable type is the minimum. Non-sortable data of the selected value of an object can be determined as non-sortable data about the field of the condition type.

A field of the list type includes at least one element. Considering the similarity of elements, metadata of any element of the field of the list type can be determined as metadata of the field. A combination of sortable data of the at least one element can also be determined as sortable data of the field. A combination of non-sortable data of the at least one element can be determined as non-sortable data of the field.

In addition, the sortable schema of the objects can also specify a sorting mode (positive or reverse order) of the fields. When the sorting mode is reverse order, the sortable data is determined by performing a bitwise inversion operation. This is applicable to fields of any type.

Figure 7:
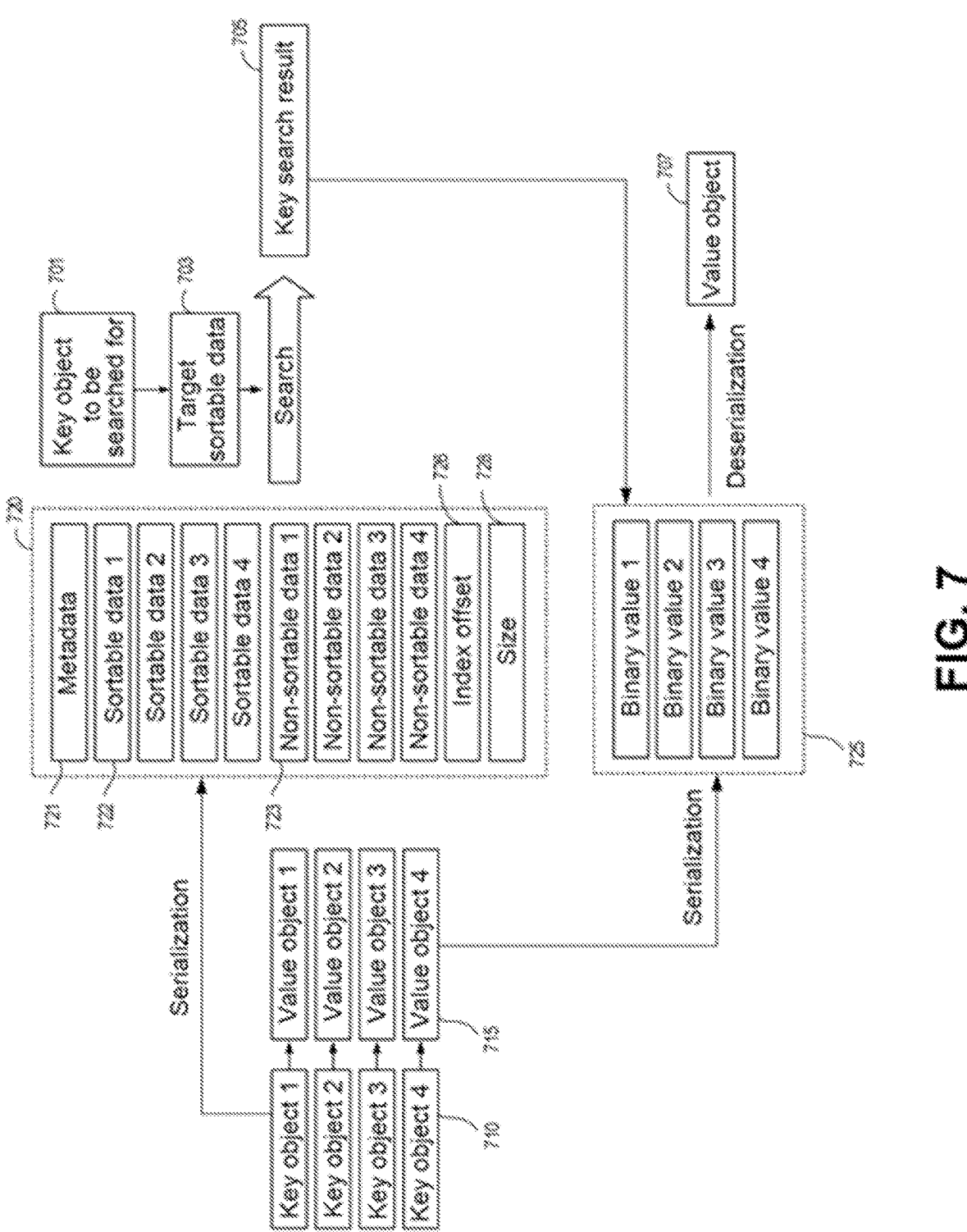
FIG. 7 illustrates a schematic diagram of a process of searching for an object according to some embodiments of the present disclosure.

An object can be directly searched for on the basis of the generated serialized representation without deserialization. FIG. 7 illustrates a schematic diagram of process 700 of searching an object according to some embodiments of the present disclosure.

As shown in the figure, a serialized representation is generated from a plurality of key objects 710 720 after being serialized. Serialized representation 720 sequentially includes metadata 721 about key object 710, sortable data 722 and non-sortable data 723 of various key objects, index offset 726, and size 728. In some embodiments, a plurality of value objects 715 corresponding to key objects 710 are also obtained, and serialized representation 725 of value objects 715 is generated through serialization. Serialized representation 725 of value objects 715 is not necessarily sortable.

During searching application, key object 701 to be searched for with a sortable schema is obtained, and sortable data of key object 701 to be searched for is determined as target sorting data through, for example, a serialization operation. The target sortable data can be used for checking whether there is a matching key object in serialized representation 720 (for example, by dichotomy, because sortable data 722 is comparable). If the matching key object exists, key object searching result 705 is output. Then, key searching result 705 is used for locating the serialized representation (binary value) of the corresponding value object in serialized representation 725 of value object 715, and corresponding value object 707 is obtained through deserialization.

Example embodiments of the present disclosure are described above with reference to FIG. 1 to FIG. 7. Compared with the existing scheme, the embodiments of the present disclosure have the advantage that one group of objects is converted into a serialized representation with sortable data, so that efficient object searching can be achieved without relying on an additional comparator. In addition, the embodiments of the present disclosure can simply use the sortable data of the object to be searched for to directly search for an object on the serialized representation, without using a deserializer to deserialize a large number of serialized representations in a database into objects for searching. Therefore, processor resources are saved, and the searching efficiency is improved.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semi-conductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus, the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

What is claimed is:

1. A method, comprising:

acquiring, by a system comprising a processor, a group of objects with a sortable schema, the sortable schema specifying at least one field of the group of objects;

determining, by the system, metadata, first data, and second data of the group of objects based on respective values of the at least one field of the group of objects;

generating, by the system, a serialized representation of the group of objects based on the metadata, the first data, and the second data, wherein the first data comprises the at least one field and the respective values of the at least one field for the group of objects, wherein the second data comprises respective position data for the at least one field of the first data in the serialized representation, and wherein the serialized representation is configured for directly searching in the first data for the respective values of the at least one field for the group of objects in the serialized representation without deserializing the objects and comparing the respective values of the at least one field in the serialized representation without deserializing the objects; and storing, by the system, the serialized representation of the group of objects.

2. The method according to claim 1, wherein the objects of the group of objects are key objects, wherein the acquiring comprises:

acquiring a group of value objects corresponding to the key objects, and wherein the generating comprises:

generating the serialized representation of the group of value objects.

3. The method according to claim 2, further comprising:

acquiring, by the system, a key object to be searched for;

determining, by the system, the first data of the key object to be searched for as target first data;

searching, by the system, the first data of the serialized representation of the group of objects for the target first data; and based on a result of the searching, acquiring, by the system, a value object corresponding to found target first data.

4. The method according to claim 3, wherein the serialized representation is a first serialized representation, and wherein the acquiring of the value object corresponding to the found target first data comprises:

acquiring a second serialized representation of the value object corresponding to the target first data; and acquiring the value object by deserializing the second serialized representation of the value object.

5. The method according to claim 1, wherein the metadata comprises version information of the sortable schema.

6. The method according to claim 1, wherein the serialized representation of the group of objects comprises an index offset, and wherein the index offset indicates positions of respective portions of the first data and the second data of each object in the serialized representation.

7. The method according to claim 1, wherein the at least one field comprises a field of a basic type, and the determining of the metadata, the first data, and the second data of the group of objects comprises:

for the field of the basic type,
determining field metadata about the field based on a range applicable to the respective values of the field of the group of objects;
determining first field data about the field by adding at least one of specified symbols or information indicating a size applicable to the respective values of the field of the group of objects, or determining the respective values of the field as the first field data about the field; and
determining a position that indicates the first field data about the field as second field data about the field.

8. The method according to claim 1, wherein the at least one field comprises a field of an object type; the field further comprises at least one subfield; and the determining of the metadata, the first data, and the second data of the group of objects comprises:

for the field of the object type,
determining a combination of subfield metadata about the at least one subfield as field metadata about the field;
determining a combination of first subfield data about the at least one subfield as first field data about the field; and
determining a combination of second subfield data about the at least one subfield as second field data about the field.

9. The method according to claim 1, wherein the at least one field comprises a field of a condition type; the field comprises one of a group of optional values; and the determining of the metadata, the first data, and the second data of the group of objects comprises:

for the field of the condition type,
determining value metadata of a selected value of the group of objects as field metadata about the field;
determining a combination of a condition indicator of the selected value and value first data of the selected value as field first data about the field; and
determining value second data about the selected value as field second data about the field.

10. The method according to claim 1, wherein the at least one field comprises a field of a list type; the field comprises at least one element; and the determining of the metadata, the first data, and the second data of the group of objects comprises:

for the field of the list type,
determining element metadata of any of the at least one element as field metadata about the field;
determining a combination of element first data of the at least one element as first field data about the field; and
determining a combination of element second data of the at least one element as second field data about the field.

11. The method according to claim 1, wherein the sortable schema further specifies a sorting mode of fields, and the determining of the first data of the group of objects comprises: determining, in response to the sorting mode indicating a reverse order, the first data by executing a bitwise inversion operation.

12. A device, comprising:
at least one processing unit; and
at least one memory, the at least one memory being coupled to the at least one processing unit and storing instructions for execution by the at least one processing unit, wherein the instructions, when executed by the at least one processing unit, cause the device to perform acts, comprising:
acquiring objects with a sortable schema, the sortable schema specifying at least one field of the objects;
determining metadata, first data, and second data of the objects based on respective values of the at least one field of the objects;
generating a serialized representation of the objects based on the metadata, the first data, and the second data, wherein the first data comprises the at least one field and the respective values of the at least one field of the objects, wherein the second data comprises respective position data for the at least one field of the first data in the serialized representation, and wherein the serialized representation is configured for directly searching in the first data for the respective values of the at least one field for the objects in the serialized representation without deserializing the objects and comparing the respective values of the at least one field in the serialized representation without deserializing the objects; and
storing the serialized representation of the objects.

13. The device according to claim 12, wherein the objects are key objects, and the acts further comprises:
acquiring value objects corresponding to the key objects; and
generating respective value object serialized representations of the value objects.

14. The device according to claim 13, wherein the acts further comprise:
acquiring a key object to be searched for;
determining the first data of the key object to be searched for as target first data;
searching the first data of the serialized representation of the objects for the target first data resulting in found target first data; and
acquiring a value object corresponding to the found target first data.

15. The device according to claim 14, wherein the acquiring of the value object corresponding to the found target first data comprises:
acquiring a value object serialized representation of the value object corresponding to the target first data; and
acquiring the value object by deserializing the value object serialized representation of the value object.

16. The device according to claim 12, wherein the metadata comprises version information of the sortable schema.

17. The device according to claim 12, wherein the serialized representation of the objects further comprises an index offset, and the index offset indicates positions of the first data and the second data of each object in the serialized representation.

18. A non-transitory computer program product comprising machine-executable instructions that, when executed by a device comprising a processor, cause the device to perform operations, comprising:
acquiring a plurality of objects with a sortable schema, the sortable schema specifying at least one field of the plurality of objects;

determining metadata, first data, and second data of the plurality of objects based on respective values of the at least one field of the plurality of objects;

generating a serialized representation of the plurality of objects based on the metadata, the first data, and the second data, wherein the first data comprises the at least one field and the respective values of the at least one field for the plurality of objects, wherein the second data comprises respective position data for the at least one field of the first data in the serialized representation, and wherein the serialized representation is configured for directly searching the first data for the respective values of the at least one field for the plurality of objects in the serialized representation without deserializing the objects and comparing the respective values of the at least one field in the serialized representation without deserializing the objects; and storing the serialized representation of the plurality of objects.

19. The non-transitory computer program product according to claim 18, wherein the objects are key objects, and the acquiring and the generating comprise, respectively:

acquiring value objects corresponding to the key objects; and generating respective serialized representations of the value objects.

20. The non-transitory computer program product according to claim 18, wherein the metadata comprises version information of the sortable schema, wherein the serialized representation of the plurality of objects further comprises an index offset, and wherein the index offset indicates respective positions of respective first data of the first data and respective second data of the second data of each object of the plurality of objects in the serialized representation.

* * * * *